(12) United States Patent
Kolli et al.

(10) Patent No.: US 12,050,562 B1
(45) Date of Patent: Jul. 30, 2024

(54) NORMALIZATION ENGINE TO DYNAMICALLY MAP AND UN-MAP DATA

(71) Applicant: Pronto Technology, Inc., Cupertino, CA (US)

(72) Inventors: Swaroop Kolli, San Jose, CA (US); Manoj Kumar, San Jose, CA (US)

(*) Notice: Subject to any disclaimer, the term of this patent is extended or adjusted under 35 U.S.C. 154(b) by 31 days.

(21) Appl. No.: 17/680,953

(22) Filed: Feb. 25, 2022

Related U.S. Application Data (60) Provisional application No. 63/154,458, filed on Feb. 26, 2021.

(51) Int. Cl.
*G06F 16/21* (2019.01)
*G06F 16/22* (2019.01)
*G06F 16/23* (2019.01)
*G06Q 30/01* (2023.01)

(52) U.S. Cl.
CPC ........ *G06F 16/211* (2019.01); *G06F 16/2282* (2019.01); *G06F 16/2308* (2019.01); *G06F 16/2358* (2019.01); *G06Q 30/01* (2013.01)

(58) Field of Classification Search
CPC .............. G06F 16/211; G06F 16/2282; G06F 16/2308; G06F 16/2358
USPC ....................................................... 707/803
See application file for complete search history.

(56) References Cited

U.S. PATENT DOCUMENTS

| 8,521,758 | B2 | 8/2013 | Nachnani | |
|---|---|---|---|---|
| 9,256,840 | B2 | 2/2016 | Said | |
| 2013/0091184 | A1* | 4/2013 | Alexe | G06F 16/211 |
| | | | | 707/809 |
| 2016/0098429 | A1* | 4/2016 | Suarez | G06F 16/213 |
| | | | | 707/808 |
| 2019/0213346 | A1* | 7/2019 | Friedman | G06F 21/6218 |
| 2020/0118161 | A1* | 4/2020 | Samuel | G06Q 30/0207 |

* cited by examiner

*Primary Examiner* — Hung T Vy
(74) *Attorney, Agent, or Firm* — Miller IP Law; Devin Miller (57) ABSTRACT

In various embodiments, a process for dynamically mapping and un-mapping data includes generating a first mapping that maps each of at least a subset of phases defined in a first schema to a corresponding source schema phase associated with a source set of records and generating a second mapping that maps each of at least a subset of phases defined in a second schema to a corresponding phase defined in the first schema. The process includes using the first mapping and the second mapping to provide shared access to records comprising data from the source set of records, at least in part by: using the first mapping to obtain and store, in the memory, data comprising one or more records from the source set of records; and using the second mapping to provide shared access to said data comprising one or more records from the source set of records.

21 Claims, 10 Drawing Sheets

Settings/
Company A

General
Profile
Branding
Users
Values
Custom fields
Authentication
Dataset
eSignature
Partners
Integrations
Audit Logs
API Keys Menu
410

Opportunity stages
Configure various stages that an opportunity goes through in its lifecycle.

| Prospecting ... |
| First Meeting ... |
| Needs Analysis ... |
| Proposal ... |
| Negotiation ... |
| Closed Won ... |
| Qualified Out ... |

Opportunity types
Configure the different types of opportunity for the sales lifecycle.

Panel
420

FIG. 4

Ecosystem/ Company A

Menu 510:
- Dashboard
- Overview
- Tasks
- Customers
- Planning
- Solutions
- Marketing
- Sales
- Contacts
- Opportunities
- Insights
- Notes
- Documents
- Configuration

Opportunities

Panel 520

[Search 502] [Data source(s) 504] [Add opportunity 506]

| | Opportunity name | Stage | Deal size | Deal close date | Account name | Geo(s) | Generated by | |
|---|---|---|---|---|---|---|---|---|
| | All companies ▸ | All stages ▸ | All geos ▸ | All source types ▸ | ▲ 38 | | ↕ ← 508 | |
| ☐ | Opp 1 | Negotiation | 100K | 6 Jan 2022 ▲ | User123 | APAC | Company A | DB1 ⋯ |
| ☐ | Opp 2 | Closed won | 85.5K | 31 Jan 2022 ▲ | User456 | EMEA | Company A | DB1 ⋯ |
| ☐ | Opp 3 | Prospecting | 10K | 30 Apr 2020 | User123 | AMER | Company B | DB1 ⋯ |
| ☐ | Opp 4 | Needs Analysis | 75K | 6 Jan 2022 ▲ | User789 | AMER | Company B | DB1 ⋯ |

522 (dashed box around Stage column)

| Ecosystem/<br>Company A-<br>Company B<br>Partnership | Map opportunity stages<br>Map your sales lifecycle with that of your participant companies in the relationship. Your participant companies' sales lifecycle shows up as they configured it in their instance of System. | |
|---|---|---|
| Dashboard | | |
| Overview | Company A<br>opportunity stages | Company B _Edit_<br>opportunity stages |
| Tasks | | |
| Customers | Prospecting | Prospecting |
| ... | | |
| Configuration | First Meeting | Prospecting |
| Product(s) | | |
| Accounts | Needs Analysis | Discovery, Demonstrating Value |
| Campaigns | | |
| Leads | Proposal | Customer Evaluation |
| Contacts | | |
| Opportunities | Negotiation | Closing |
| | | |
| | Closed Won | Closed Won |
| | | |
| | Qualified Out | Closed Lost |

Ecosystem/
Company A-
Company B
Partnership

Dashboard
Overview
Tasks
Customers
...
Marketing
Sales
Insights
Notes
Documents
Configuration
Product(s)
Accounts
Campaigns
Leads
Contacts
Opportunities

Pull opportunities
Configure filter condition(s) to only import relevant opportunities into the relationship. Once you set up the filter, click on 'Save' to start the import process. Imported opportunities will show up in the Opportunities section of the relationship.

⬤ Enabled

Filter name
Fetch all opportunities with amount

Application object: Opportunity

Amount ▸   Greater Than ▸   Enter value(s)

[ Cancel ]   [ Save ]

▸ Push opportunities ◂
Configure filter condition(s) to only export relevant opportunities into the relationship. Additionally, you can push all opportunities available in this specific relationship. Once you set up the filter, click on 'Save & Push' to start the export process. Exported opportunities will show up in your Source records.

⬤ Enable

NORMALIZATION ENGINE TO DYNAMICALLY MAP AND UN-MAP DATA

CROSS REFERENCE TO OTHER APPLICATIONS

This application claims priority to U.S. Provisional Patent Application No. 63/154,458 entitled NORMALIZATION ENGINE TO DYNAMICALLY MAP AND UN-MAP DATA filed Feb. 26, 2021 which is incorporated herein by reference for all purposes.

BACKGROUND OF THE INVENTION

Organizations may wish to collaborate or form partnerships such as developing joint products, integrating existing products, or promoting products together. For example, organizations may wish to cooperate by sharing data about sales or marketing opportunities. However, there are many technical difficulties for sharing data due to issues such as use of different customer relationship management (CRM) systems, data schema incompatibility, data object incapability, and the like.

BRIEF DESCRIPTION OF THE DRAWINGS

Various embodiments of the invention are disclosed in the following detailed description and the accompanying drawings.

FIG. 5 shows an example of a graphical user interface displaying records associated with different users and schemas according to an embodiment of the present disclosure.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of the present disclosure provide a normalization engine to dynamically map and un-map data. In various embodiments, data is normalized so that all parties can view a common shared data model despite possibly having the data sourced from different, traditionally incompatible sources. The original data may have different data schema because they come from different customer relationship management (CRM) systems, are defined by different organizations, use different data objects, etc. For example, parties may wish to share data associated with phases. Each organization may have its own schema defining phases, where the schema varies from organization to organization. Conventional techniques typically do not allow organizations using different schema to share data or are unable to share correct information because the phases do not match up. The disclosed techniques enable such data to be shared by providing a normalization engine that dynamically maps and un-maps data.

In various embodiments, a process includes generating a first mapping that maps each of at least a subset of phases defined in a first schema to a corresponding source schema phase associated with a source set of records. The process includes generating a second mapping that maps each of at least a subset of phases defined in a second schema to a corresponding phase defined in the first schema. The process includes using the first mapping and the second mapping to provide shared access to records comprising data from the source set of records, at least in part by: using the first mapping to obtain and store data comprising one or more records from the source set of records, and using the second mapping to provide shared access to said data comprising one or more records from the source set of records.

Figure 1:
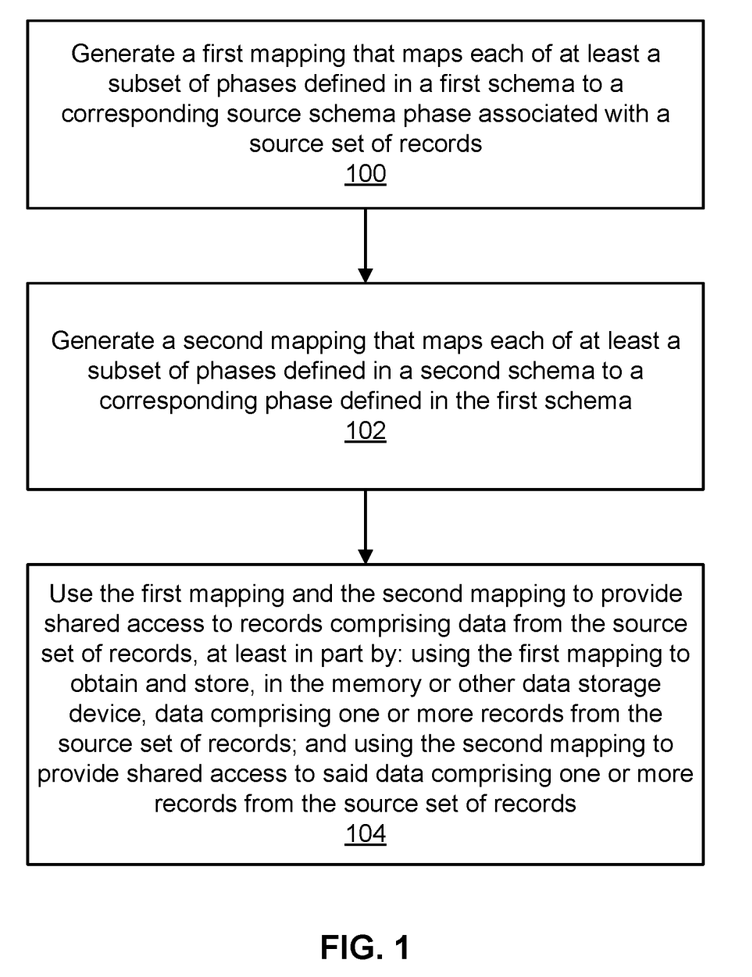
FIG. 1 is a flow chart illustrating an embodiment of a process for dynamically mapping and un-mapping data.

FIG. 1 is a flow chart illustrating an embodiment of a process for dynamically mapping and un-mapping data. The process can be implemented by a normalization engine such as 304 of FIG. 3. The process will be explained with the aid of FIG. 2.

Figure 2:
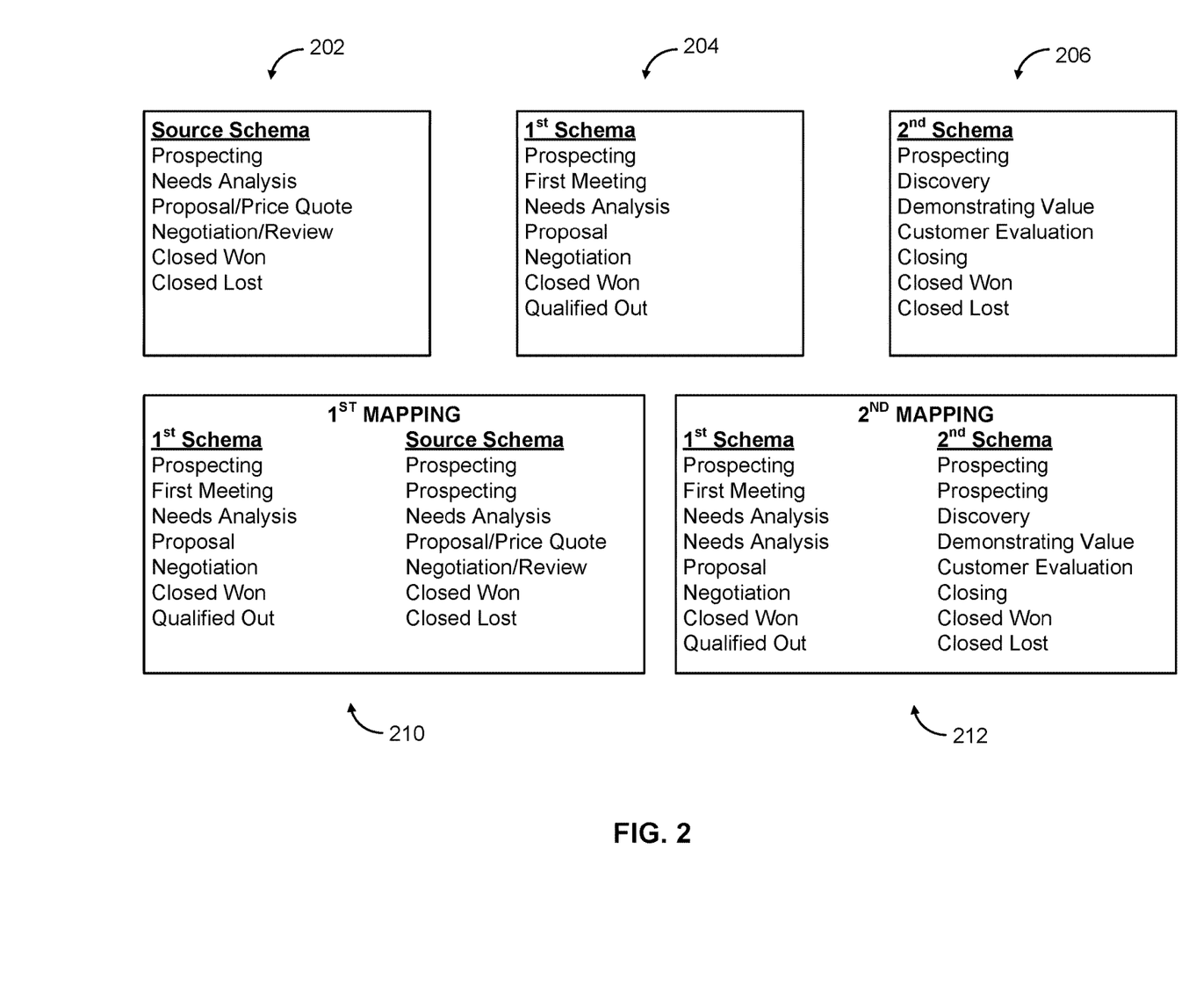
FIG. 2 shows an example of schemas and mappings obtained according to an embodiment of the present disclosure.

FIG. 2 shows an example of schemas and mappings obtained according to an embodiment of the present disclosure. The example in this figure shows three schema 202, 204, and 206 each having phases of a sales opportunity, sometimes simply called "opportunity phases."

A source schema 202 includes the following phases:
Prospecting
Needs Analysis
Proposal/Price Quote
Negotiation/Review
Closed Won
Closed Lost A first schema 204 includes the following phases:
Prospecting
First Meeting
Needs Analysis
Proposal
Negotiation
Closed Won
Qualified Out A second schema 206 includes the following phases:
Prospecting
Discovery
Demonstrating Value
Customer Evaluation
Closing
Closed Won
Closed Lost Each of the source schema 202, first schema 204, and second schema 206 can be defined by a respective organization. In various embodiments, the source schema is defined by a platform that is a source or repository of data records (an example of which is Salesforce®), the first schema is defined by a first tenant (a user of a Pronto web portal/application for example), and the second schema is defined by a second tenant (another user of a Pronto web portal/application for example). Each of the phases is associated with records (not shown), which can be stored in a platform (local or remote) that is maintained by a respective user or by a third party. For example, records associated with a Prospecting phase may be contact information and notes about prospects.

A schema can be defined by using a template. The template includes fields, which may include system-defined default fields and/or user-defined fields. The system may provide an industry-standard template and/or a user can define custom fields. For example, a first user (e.g., User 1) uses a template to populate phases via a system (e.g., Pronto web portal/application as further described with respect to FIG. 3). Similarly, a second user (e.g., User 2) uses a template to populate phases via the Pronto web portal/application. User 1 can be associated with a first organization and access the system via a first client. User 2 can be associated with a second organization and access the system via a second client. The first user and the second user can be part of the same organization or in different organizations. They can be associated with the same type of CRM system or different types of systems.

The process of FIG. 1 can be performed to map phases of the first schema 204 to phases of the source schema 202 and to map phases of the first schema 204 to phases of the second schema 206.

Returning to FIG. 1, the process begins by generating a first mapping that maps each of at least a subset of phases defined in a first schema to a corresponding source schema phase associated with a source set of records (100). The process obtains one or more phases defined in the first schema and obtains one or more phases defined in the source schema, and associates one or more phases of the first schema with one or more phases of the source schema. After the mapping is determined as further described herein, the mapping can be stored.

Referring briefly to FIG. 2, an example of a mapping of the first schema 204 to the source schema 202 is mapping 210. In this example, Prospecting, which is a phase in the first schema, is mapped to Prospecting, which is a phase in the source schema. First Meeting, which is another phase in the first schema, is also mapped to the Prospecting source schema phase, and so on. As shown, one or more first schema phases can be mapped to one or more source schema phases.

In various embodiments, the source set of records includes customer relationship records. By way of non-limiting example, FIG. 2 show phases defined in the first schema and the phases defined in the second schema that are opportunity phases or stages of a sales opportunity, The disclosed mapping and un-mapping techniques can be applied to other types of data such as marketing in which the phases defined in the first schema and the phases defined in the second schema include marketing campaign phases.

Regardless of the type of data in the records, the first schema can be derived from a first set of records and the second schema can be derived from a second set of records. For example, a record contains sales opportunity information spread over various phases, so the first schema is derived by identifying phases that are opportunity phases. Examples of a records are further described with respect to FIGS. 5 and 6.

Returning to FIG. 1, the process generates a second mapping that maps each of at least a subset of phases defined in a second schema to a corresponding phase defined in the first schema (102). The process obtains one or more phases defined in the first schema and obtains one or more phases defined in the second schema, and associates one or more phases of the first schema with one or more phases of the second schema. After the mapping is determined as further described herein, the mapping can be stored.

Referring briefly to FIG. 2, an example of a mapping of the first schema 204 to the second schema 206 is mapping 212. In this example, Needs Analysis, which is a phase in the first schema, is mapped to Discovery, which is a phase in the second schema. Demonstrating Value, which is another phase in the second schema, is also mapped to the Needs Analysis first schema phase, and so on. As shown, one or more first schema phases can be mapped to one or more second schema phases.

Each of the first mapping and the second mapping can be performed manually or automatically, e.g., by applying a machine learning model to the subset of phases defined in a first schema, or in a combination thereof. In various embodiments, the mappings (210 and 212) are generated automatically (at least initially). The mappings can be based at least in part on one or more of the following: a pre-defined mapping, a source CRM system or service, a past mapping for a same customer, synonyms, and a machine learning model mapping prediction.

In various embodiments, the machine learning model is trained to ingest an input phase and find a corresponding schema phase. For example, an input phase First Meeting from the first schema is recognized to correspond to source schema phase Prospecting. Each phase may have associated metadata describing the phase, which is used by the machine learning model to performing the mapping. In various embodiments, after a machine learning model performs an initial mapping, the mapping can be adjusted manually. In other words, the automatic generation of at least one of the first mapping and the second mapping is confirmed or corrected via the user interface, an example of which is shown in FIG. 9B. Any changes can be used to update the machine learning model to improve its ability to perform subsequent mappings. An example user interface for defining a schema is further described with respect to FIG. 4. An example user interface for mapping a first schema to a source schema is further described with respect to FIGS. 7 and 8. An example user interface for mapping a first schema to a second schema is further described with respect to FIGS. 9A and 9B.

Returning to FIG. 1, the process uses the first mapping and the second mapping to provide shared access to records comprising data from the source set of records, at least in part by: using the first mapping to obtain and store, in the memory or other data storage device, data comprising one or more records from the source set of records; and using the second mapping to provide shared access to said data comprising one or more records from the source set of records (104).

The first and second mappings enable an organization using the first schema and an organization using the second schema to access each other's records despite the schemas being different from each other. Conventionally, it is challenging to provide shared access to records if organizations use schemas that differ from each other.

According to embodiments of the present disclosure, the first mapping can be used to obtain data comprising one or more records from the source set of records. For example, the first mapping is used to ingest the source set of records and map each of the at least a subset of phases defined in the first schema to the corresponding source schema phase.

If the data is modified, the changes to the data can be stored. In various embodiments, after or as part of 104, the process receives an update to a record in the source set of records. The process uses the first mapping to propagate changes back to a source system including by updating the source set of records.

The second mapping can be used to provide shared access to the obtained data. In various embodiments, the shared access is such that a first user associated with the first schema accesses records associated with a second user, where the records are ingested from a source system. The first user is associated with an organization or enterprise and the second user is associated with a different organization or enterprise. The shared access can be provided by query, as further described with respect to the examples shown in FIGS. 5 and 10. An example user interface showing a data record accessed by performing the process of FIG. 2 is further described with respect to FIG. 6.

The process can be thought of as normalization because the process normalizes at least one of the first set of phases and the second set of phases including by mapping phases to each other. The mapping can be performed based on a schema and attribute level values. The mapping can be performed at an object level or an attribute value (life cycle stage) level. A mapping would cause data associated with a data set field to be displayed for the template field.

An example of how the mappings can be used to provide shared access is as follows. Suppose User 1 wants to view data (via a Pronto web portal) associated with a stage and at least some of the data is owned by User 2. The process of FIG. 1 can be performed to de-normalize (un-map) the data to show the data in the appropriate stage intelligible to User 1.

In various embodiments, a first tenant of Pronto web portal/application takes on the role of a lead and a second tenant of Pronto web portal/application takes on the role of a partner. The lead can have more capabilities with respect to defining the mappings by being the one to which the source schema and the second schema are mapped. In other words, a partner's phases are not mapped to the source schema and instead are mapped to the lead's phases. In this example, the lead defines the first schema 204 and the partner defines the second schema 206. In various embodiments, the role of the lead and partner can be reversed and/or mappings can be defined bilaterally. In the examples described herein, Company A is the lead and Company B is the partner.

At least one of the first mapping and the second mapping is stored as a data structure in various embodiments. Referring to mapping 210 of FIG. 2 for example, the data structure includes a table in which each row stores, for at least one of the phases defined in the first schema, a corresponding source schema phase to which it is mapped. Referring to mapping 212 of FIG. 2 for example, the data structure includes a table in which each row stores, for at least one of the phases defined in the first schema, a corresponding second schema phase to which it is mapped.

Figure 3:
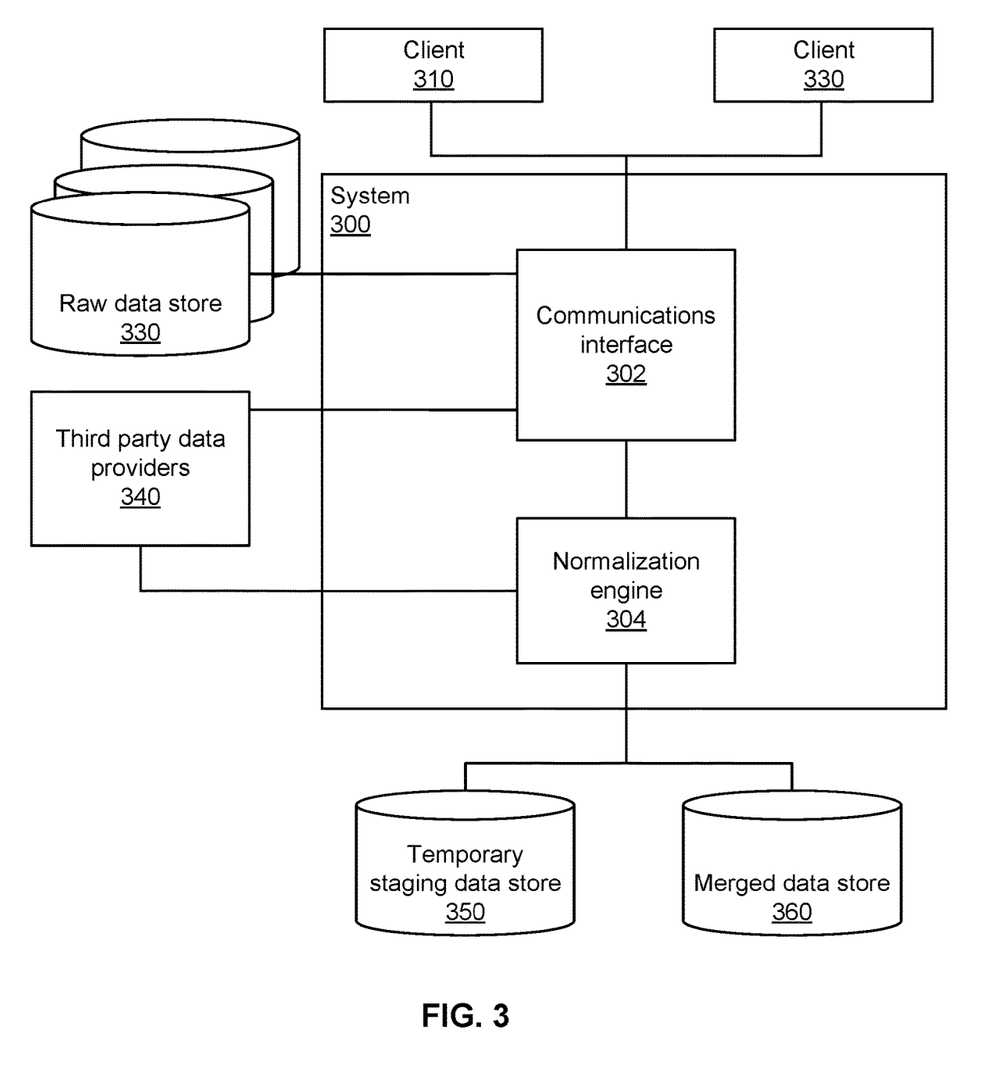
FIG. 3 is a block diagram illustrating an embodiment of a system for dynamically mapping and un-mapping data.

FIG. 3 is a block diagram illustrating an embodiment of a system for dynamically mapping and un-mapping data. As will be apparent, other computer system architectures and configurations can be used to dynamically map and un-map data. Computer system 300, which includes various subsystems as described below, includes at least one microprocessor subsystem (also referred to as a normalization engine or a processor) 304. For example, system 300 can be implemented by a single-chip processor or by multiple processors. In some embodiments, system 300 is a general purpose digital processor. Using instructions retrieved from memory, the system controls the reception and manipulation of input data, and the output and display of data on output devices. In some embodiments, system 300 executes/performs the process of FIG. 1.

Various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

System 300 is communicatively coupled to a first client 310 and a second client 320. A user of the first client ("first user") and a user of the second client ("second user") can each interact with system 300 to access and/or share data belonging to the first user and the second user. System 300 is configured to manage interactions between a first client 310 (e.g., Organization 1 using the first client) and a second client 320 (e.g., Organization 2 using the second client).

System 300 may be included in or embodied by a Web application (e.g., Django/Python Web application). An example of the Web application is the one by Pronto Technology, Inc. The Web application is a collaborative shared system of engagement to automate operations and explores the full potential and return on investment of constituents. System 300 is configured to perform the process of FIG. 1 to dynamically map and un-map data.

System 300 is configured to manage one or more lifecycle stages of a relationship between two organizations including by resolving technical challenges. Lifecycle stages may include one or more of the following:
  Partner programs
  Onboarding and contract management
  Planning
  Joint solutions/projects or integrations
  Co-marketing
  Co-selling
  Marketplace
  Ecosystem/partner/relationship performance monitoring or analysis System 300 includes communications interface 302 and normalization engine 304. Data associated with the first user or second user may be kept in a remote location such as raw data store 330 and third party data providers 340. Communications interface 302 is configured to extract data corresponding to each organization from raw data store 330 and third party data providers 340; and/or receive input from and provide output to clients 310 and 320, e.g., by rendering or via a user interface. In various embodiments, the communication interface is configured to receive a first schema via a first client 310 and/or a second schema via a second client 330. Examples of raw data stores include SalesForce® and Microsoft Dynamics®. Examples of third party data providers include Crunchbase® and ZoomInfo®. An example of communications interface 302 is a Web portal, which can be implemented by a Django® Web framework for example.

Normalization engine 304 is configured to map and/or un-map data from different sources (e.g., 330 or 340) by performing the process of FIG. 1. The different sources are sometimes collectively referred to as memory or other data storage device. The data may have different schema or objects. In various embodiments, the normalization engine 204 is implemented in or by a Web application that can be accessed by different organizations to view a shared data model. The normalization engine 304 outputs intermediate results to temporary staging data store 350, which may include unstructured data. One of advantage of using a structureless database for temporary staging data is that there is no limit on the data. The structure of data can be preserved in such a structureless databased using key-values. After mapping/un-mapping is complete, the normalization engine outputs data to merged data store 360. An example of temporary staging data store 350 is MongoDB®. An example of merged data store 360 is Postgres®.

System 300 can query one or more of the stores 330, 340, 350, 360, or data provider 340 periodically or on-demand to ensure that data remains fresh.

An example of the system in operation is as follows. Organization 1 uses a first CRM system (e.g., Salesforce) and Organization 2 uses a second CRM system (e.g., Microsoft Dynamics). The CRM systems use different data schemas (e.g., opportunity object in the first CRM system vs. sales object in the second CRM system). Normalization engine 204 normalizes the data by (1) integrating the two systems by mapping to a common data model and (2) harmonizing different stages of Organization 1 and Organization 2. For example, Organization 1 might have X stages while Organization 2 has Y stages. Mapping can be defined by the system 200 (e.g., defaults) or users/organizations (e.g., new fields): different entities depending on company/partner relationships. The system 200 displays the data into the appropriate stage that is a stage understood by the respective user. For simplicity, the techniques have been explained for two organizations, but can be extended to normalize data for more than two organizations.

In various embodiments, generating the first mapping (100) and generating the second mapping (102) includes displaying a user interface to show the phases defined in the first schema and the corresponding second schema phases and receive user input for mapping as explained with respect to the following figures. The following figures show example graphical user interfaces for interacting with the normalization engine in various stages.

Figure 4:
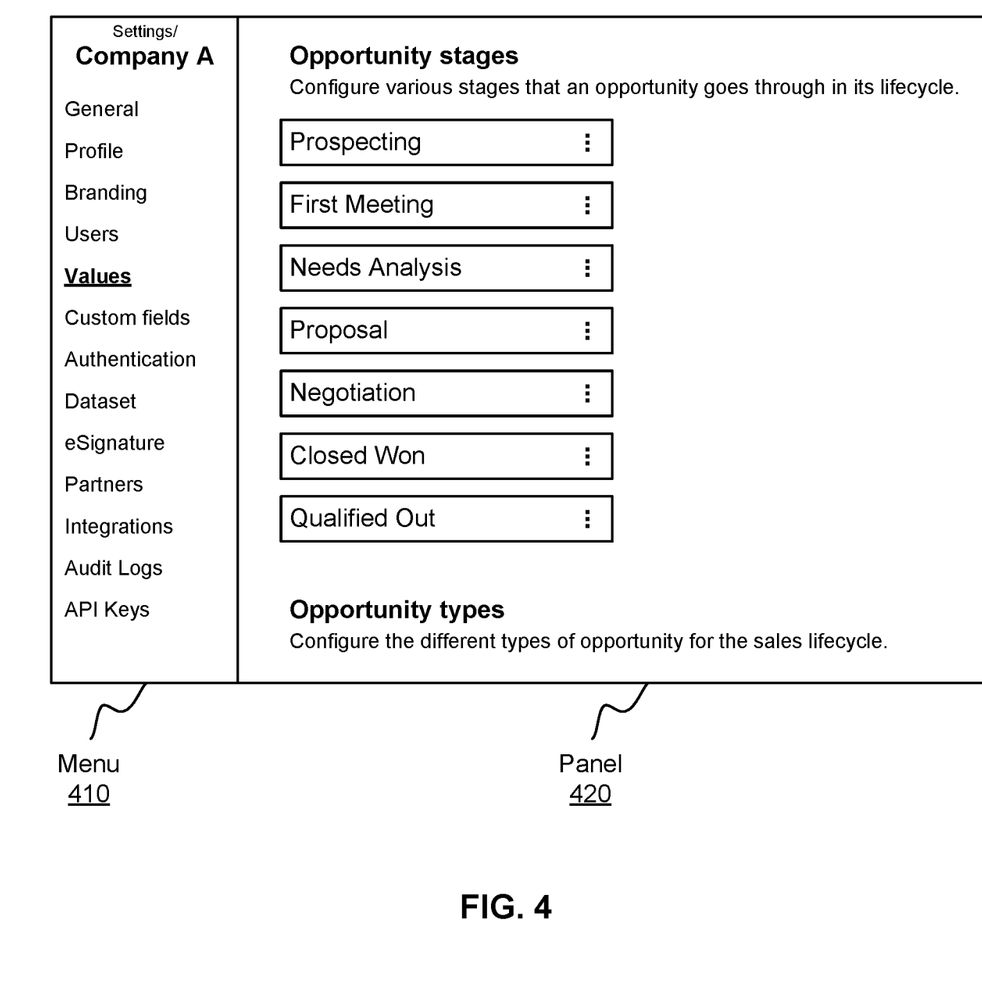
FIG. 4 shows an example of a graphical user interface for defining a schema according to an embodiment of the present disclosure.

FIG. 4 shows an example of a graphical user interface for defining a schema according to an embodiment of the present disclosure. The user interface can be displayed in a platform such as Pronto Web portal. In this example, the user interface allows a user associated with Company A to modify its settings, specifically values for opportunity stages. Company A can define a schema with the seven phases (stages) shown (Prospecting, First Meeting, etc.). This example corresponds to the one shown in FIG. 2 with the schema here corresponding to first schema 204. Company A can use system (template) fields suggested by a platform such as Pronto Web portal or an industry standard and/or create custom fields.

The user interface includes a menu 410 and panel 420 for displaying information corresponding to a menu item, here, Values. The menu items and elements displayed within panel 420 are merely exemplary and not intended to be limiting. For example, stages can be added to or removed from the ones shown here. Selecting the three dots next to each stage allows the stage to be modified, as further described herein.

FIG. 5 shows an example of a graphical user interface displaying records associated with different users and schemas according to an embodiment of the present disclosure. In this example, a user associated with Company A can access shared data (data shared with Company B) using this interface. Menu 510 is like its counterpart in FIG. 4. Here, the menu items correspond to Ecosystem options unlike the menu items in FIG. 4, which correspond to Setting options. Panel 520 is populated by selecting Opportunities under the Sales option within menu 510.

Panel 520 includes data source button 504 and add opportunity button 506. Data source button 504 can be selected to select or modify a source of the records to search. The data sources correspond to raw data store 330 and third party data providers 340 of FIG. 3. Add opportunity button 506 allows a user to add an opportunity or a data record. The information will be stored/written to a source so that shared access can be provided to the opportunity using the process of FIG. 1. A user interface such as the one shown in FIG. 6 can be displayed to allow a user to input information for a new opportunity.

Here, data sets have been generated by two different organizations, Company A and Company B. Each company may use a different CRM system. The data records may be stored in a source, here DB1, which is a third party platform. The displayed opportunities can be searched, filtered, or otherwise organized using elements 502 and 508. Search box 502 to perform searches on the information displayed in panel 520. Sorting menu 508 allows the opportunities to be sorted or filtered by the Company that generated the opportunity, the stage, geographical area, source type (e.g., DB1 or other type of source), push/pull status (triangle), alphanumeric sorting, etc. The sorting and filtering examples here are merely exemplary and not intended to be limiting as the information can be sorted or filtered in other ways. For example, for opportunity Opp1, the corresponding stage is Negotiation, the deal size is USD $100K, the deal closed Jan. 6, 2022, the data is being pushed (instead of pulled), the account is maintained by User123, the geographical area is Asia Pacific (APAC), the data is generated by Company A, and the data is stored in database DB1.

In this example, four opportunities (Opp 1, Opp 2, Opp 3, and Opp 4) are displayed. Company A can access data associated with each of the opportunities by selecting the opportunity. Each opportunity is displayed with corresponding information including the sales opportunity stage 522. Although Company A and Company B may use different schema for the stages/phases, they can nevertheless be displayed to either company (here, Company A) in an intelligible manner. Suppose Company B uses schema 206 and generates opportunity Opp 4. Data associated with the Company's B's stage Discovery and stage Demonstrating Value would be mapped to Company A Needs Analysis stage via mapping 212 and gets displayed in panel 520 as Needs Analysis. Thus, Company A understands the information associated with Opp 4.

For example, Company A is in a Needs Analysis stage. An opportunity comes in at a Discovery stage for Company B. Company B will see this data at the Discovery stage, but Company A will see it as corresponding to the Needs Analysis stage because Company A does not have a Discovery stage or such as stage would fit under Needs Analysis in their life cycle terminology.

Figure 6:
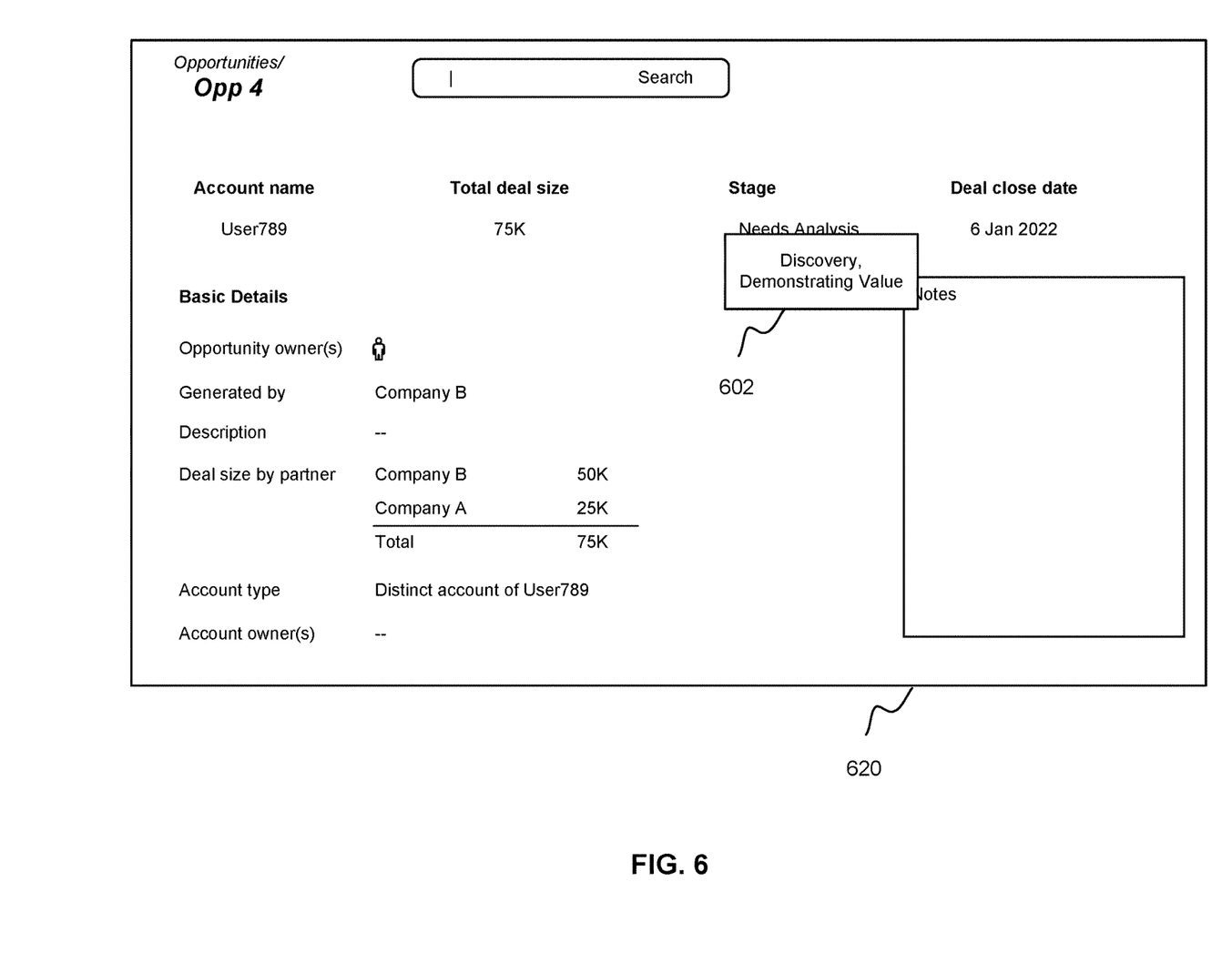
FIG. 6 shows an example of a graphical user interface displaying a record according to an embodiment of the present disclosure.

FIG. 6 shows an example of a graphical user interface displaying a record according to an embodiment of the present disclosure. Panel 620 can be displayed in response to selecting Opp 4 in FIG. 5. Panel 620 replaces panel 520 to display the details of Opp 4. The information within the record may be searched using the shown search box.

In this example, the displayed stage is Needs Analysis according to Company A's schema. By hovering over this stage, other stages (if any) may be displayed in box 602 (such as a pop-up). In this example, the corresponding stages from Company B's schema are Discover and Demonstrating Value, which get displayed in box 602.

Figure 7:
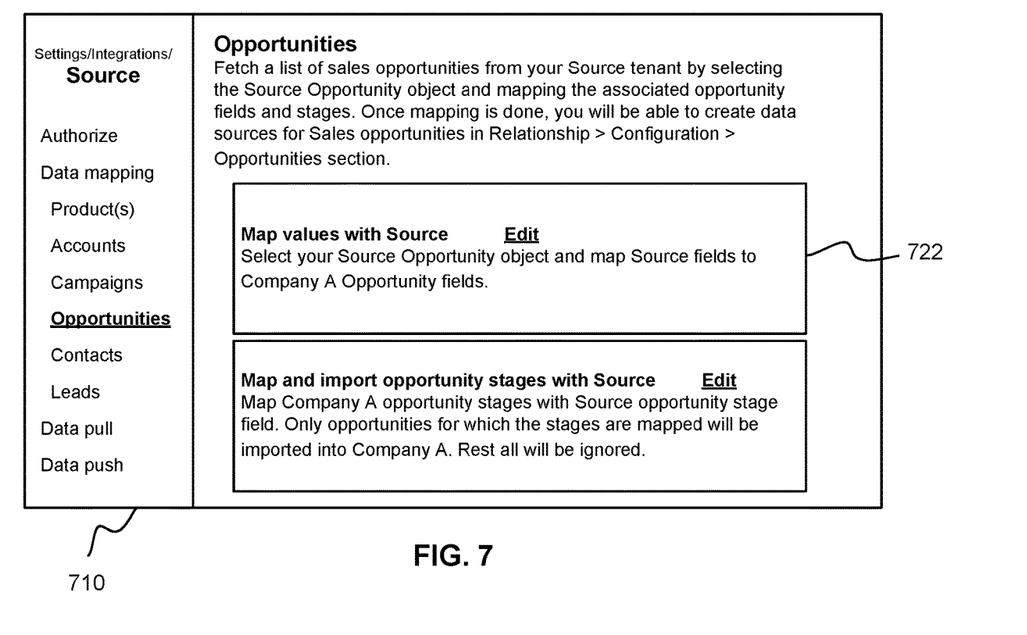
FIG. 7 shows an example of a graphical user interface for mapping a first schema to a source schema according to an embodiment of the present disclosure.

FIG. 7 shows an example of a graphical user interface for mapping a first schema to a source schema according to an embodiment of the present disclosure. In This example, a user associated with Company A can map phases from its own schema to phases of a source schema. In this example, the mapping is performed via settings associated with a source in menu 710, but this is merely exemplary and not intended to be limiting as the mapping can be defined in other areas or user interfaces of the Web portal. Selecting Edit in panel 722 causes a graphical user interface such as the one shown in FIG. 8 to be displayed.

Figure 8:
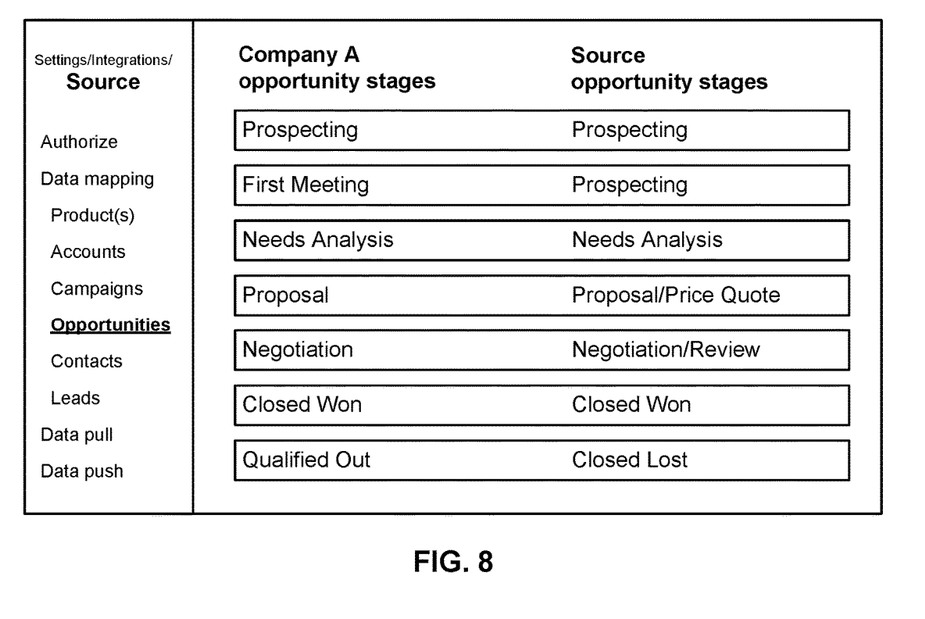
FIG. 8 shows an example of a graphical user interface displaying a mapping of a first schema to a source schema obtained according to an embodiment of the present disclosure.

FIG. 8 shows an example of a graphical user interface displaying a mapping of a first schema to a source schema obtained according to an embodiment of the present disclosure. Each row represents a mapping from a Company A field (opportunity stage) to a Source field (opportunity stage). This example corresponds to the first mapping 210 of FIG. 2. As described with respect to 104, this mapping allows records to be obtained from and stored to a source set of records.

Figure 9A:
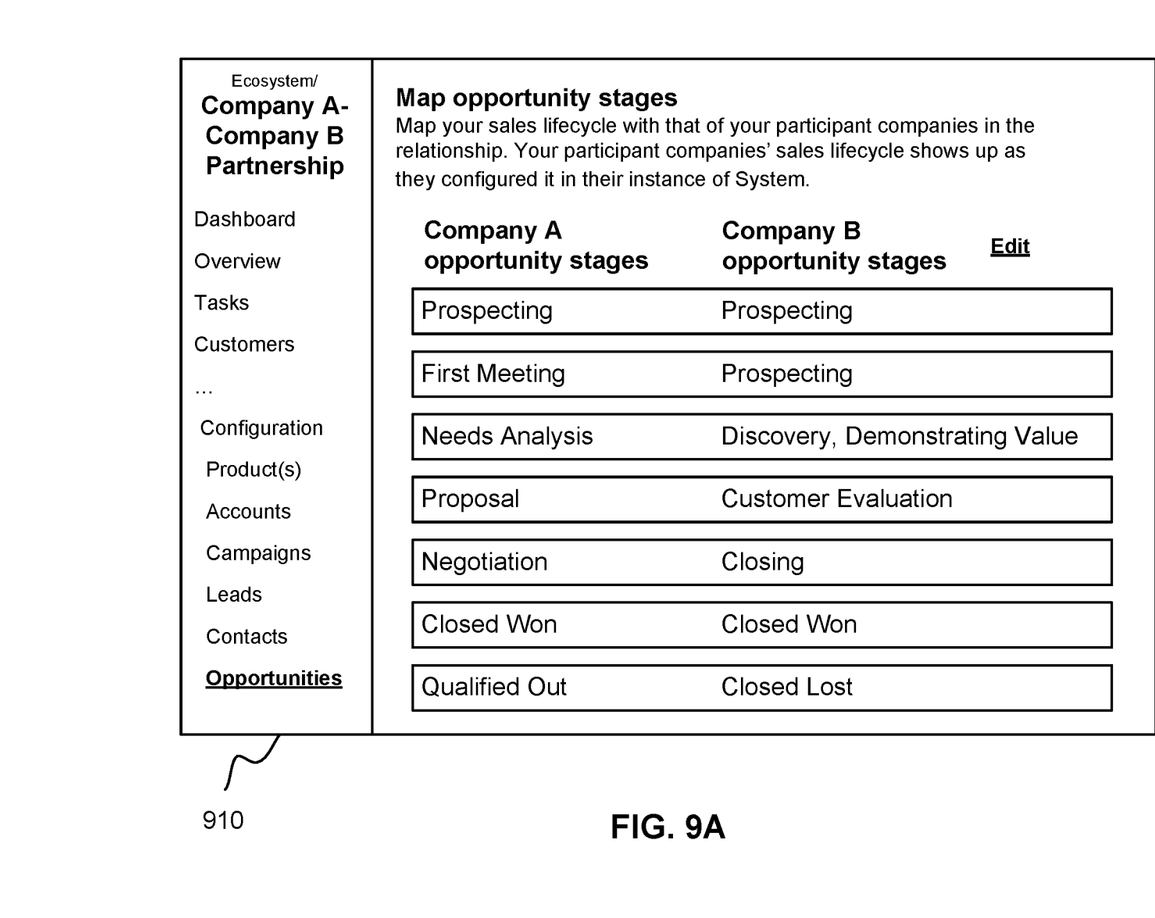
FIG. 9A shows an example of a graphical user interface displaying a mapping of a first schema to a second schema according to an embodiment of the present disclosure.
Figure 9B:
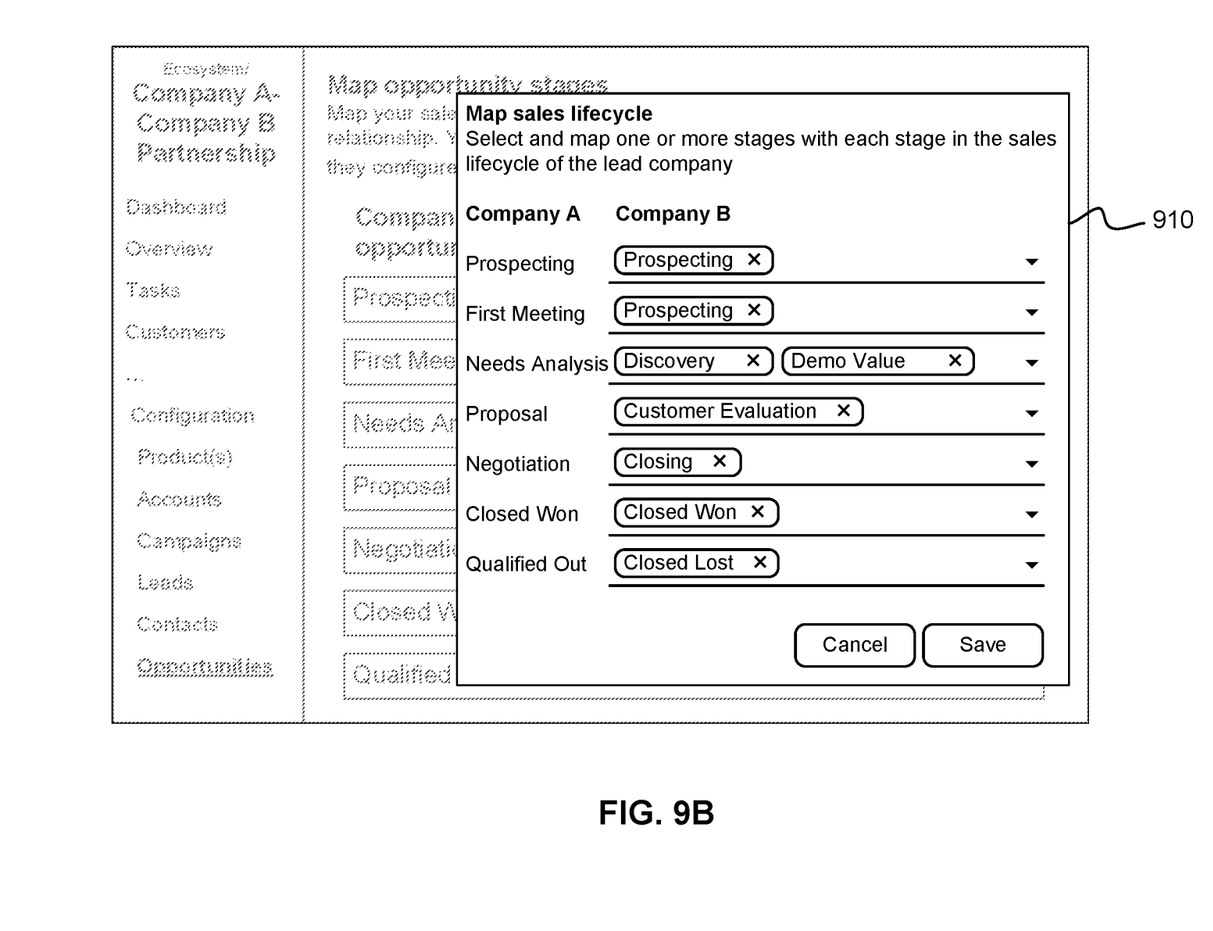
FIG. 9B shows an example of a graphical user interface for mapping a first schema to a second schema according to an embodiment of the present disclosure.

FIG. 9A shows an example of a graphical user interface displaying a mapping of a first schema to a second schema according to an embodiment of the present disclosure. This user interface displays information for a Company A-Company B partnership in which the two companies are sharing data. In this relationship, Company A is the lead and Company B is the partner/participant. Both companies use the Pronto Web portal (referred to as the "System"), so "Your participant companies' sales life cycle shows up as they configured it in their instance of System" refers to Company B's schema defined using the Pronto Web portal.

Each row represents a mapping from a Company A field (opportunity stage) to a Source field (opportunity stage). In this example, each stage of Company A get its own row and multiple stages (if any) are displayed separated by a comma. Because Discovery and Demonstrating Value both map to Needs Analysis, they get displayed in the third row as shown. Alternative ways of displaying this information are possible. For example, the first two rows may instead be displayed in a single row as "Prospecting, First Meeting" under Company A to "Prospecting" under Company B. This example corresponds to the second mapping 212 of FIG. 2. As described with respect to 204, this mapping allows multiple organizations to have shared access to records.

In this example, the mapping is performed via opportunities settings associated with an ecosystem of Company A-Company B Partnership in menu 910, but this is merely exemplary and not intended to be limiting as the mapping can be defined in other areas or user interfaces of the Web portal. The mapping can be edited by selecting the Edit button, which causes the user interface of FIG. 9B to be displayed.

FIG. 9B shows an example of a graphical user interface for mapping a first schema to a second schema according to an embodiment of the present disclosure. In this example, a pop-up box 910 displays each of the stages of Company B in editable form. The mappings can be modified as follows. A stage can be removed by selecting the X next to the stage. Stages can be added by selecting the drop-down arrow, which will cause suggested stages to be displayed or allow a user to write in a stage. In this example, Needs Analysis maps to two stages (Discovery and Demonstrating Value), so they are displayed as separate stages as show by the two separate rectangles. Changes can be saved or discard by selecting the appropriate button at the bottom of the box.

Figure 10:
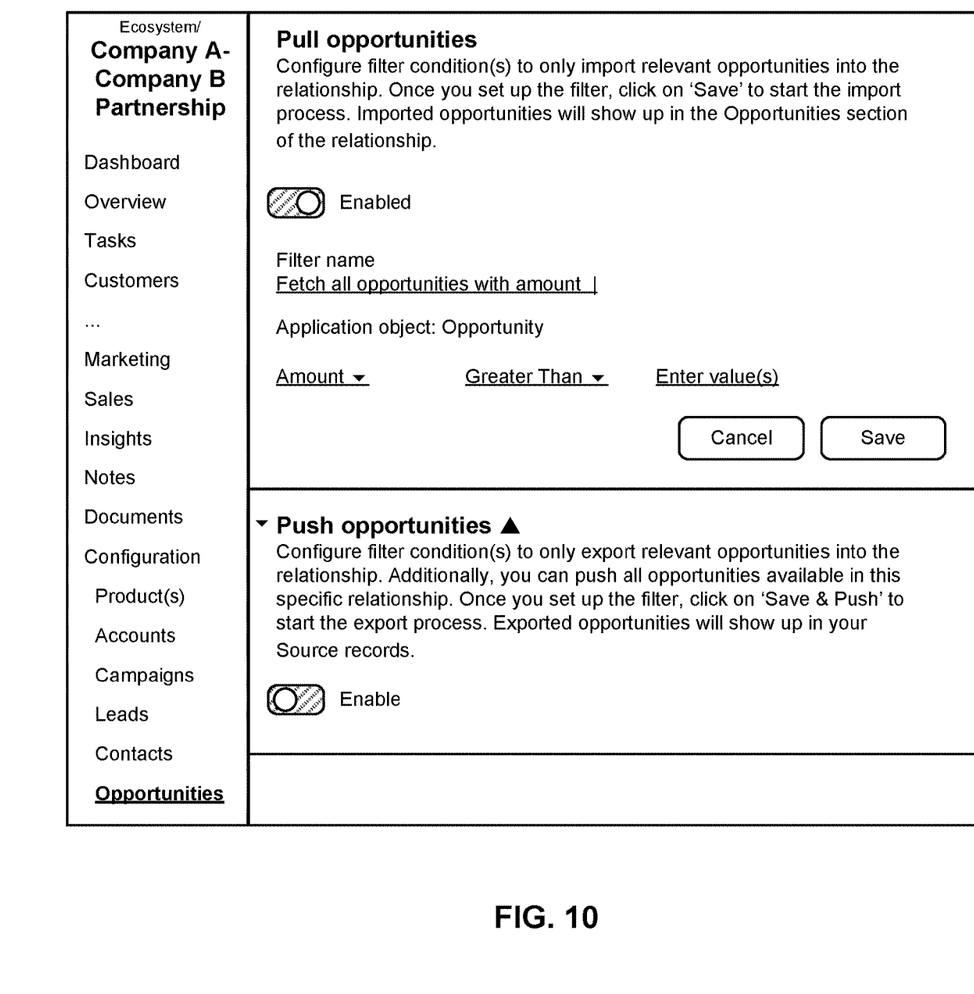
FIG. 10 shows an example of a graphical user interface for obtaining data records according to an embodiment of the present disclosure.

FIG. 10 shows an example of a graphical user interface for obtaining data records according to an embodiment of the present disclosure. One or more queries can be configured. The configuration shown here is a query to source records and causes the opportunities of FIG. 5 to be displayed or updated. Query results show first user phases per the first schema and second user phases per the second schema as mapped. A record is not included in results if a relevant phase in an applicable schema is not mapped to any phase in at least one of the first or second schema.

In this example, the query is in the form as a filter that causes records matching the filter to be displayed. The filter is to fetch all opportunities with amount greater than a user-definable value. In this example, a user can form this query by using the dropdown menus to select "Amount" and "Greater Than," then enter a value. Suppose the user enters 10K, then the opportunities in FIG. 5 get displayed because they all meet the query criteria.

Similarly push opportunities can be updated by selecting the down arrow to expand that section of the user interface to modify filters. Push opportunities automatically update records when the source updates them. When this feature is enabled, data sets that are push updated can be indicated as such using a symbol such as the triangle shown in FIG. 5. In the example of FIG. 5, a total of 38 opportunities are push updated. Of the four opportunities displayed, Opp 1, Opp 2, and Opp 4 are push updated.

The disclosed techniques can be applied to multi-party situations (e.g., more than two systems/users). The figures above show mappings between two systems, Company A and Company B. If there is a third system, in FIG. 9A another column can be provided with the fields associated with the third system so that mappings can be made between any of the three systems.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
 a memory; and
 a processor coupled to the memory and configured to:
  generate a first mapping that maps each of at least a subset of sequential phases defined in a first schema to a corresponding source schema phase associated with a source set of records;
  generate a second mapping that maps each of at least a subset of sequential phases defined in a second schema to a corresponding phase defined in the first schema, wherein at least a portion of the first mapping is different from at least a portion of the second mapping;
  use the first mapping and the second mapping to provide shared access to records comprising data from the source set of records, at least in part by:
   using the first mapping to obtain and store, in the memory, data comprising one or more records from the source set of records; and
   using the second mapping to provide shared access to said data comprising one or more records from the source set of records, wherein the shared access includes providing a first user access to records associated with a second user, the first user being associated with the first schema and the second user being associated with the second schema.

2. The system of claim 1, further comprising a communication interface configured to receive the first schema and the second schema.

3. The system of claim 1, wherein the source set of records include customer relationship records.

4. The system of claim 3, wherein the sequential phases defined in the first schema and the phases defined in the second schema include opportunity phases.

5. The system of claim 3, wherein the sequential phases defined in the first schema and the phases defined in the second schema include marketing campaign phases.

6. The system of claim 1, wherein the first schema is derived from a first set of records and the second schema is derived from a second set of records.

7. The system of claim 1, wherein the first mapping is used to ingest the source set of records and map each of the at least a subset of phases defined in the first schema to the corresponding source schema phase.

8. The system of claim 7, wherein the processor is further configured to:
 receive an update to a record in the source set of records; and
 use the first mapping to propagate changes back to a source system including by updating the source set of records.

9. The system of claim 1, wherein at least one of the first mapping and the second mapping is stored as a data structure.

10. The system of claim 9, wherein the data structure includes at least one of:
 a table in which each row stores, for at least one of the sequential phases defined in the first schema, a corresponding source schema phase to which it is mapped; and
 a table in which each row stores, for at least one of the sequential phases defined in the first schema, a corresponding second schema phase to which it is mapped.

11. The system of claim 1, wherein at least one of the generation of the first mapping and the generation of the second mapping includes displaying a user interface to:
 show the sequential phases defined in the first schema and the corresponding second schema phases; and
 receive user input for mapping.

12. The system of claim 11, wherein at least one of the generation of the first mapping and the generation of the second mapping is at least initially automatic.

13. The system of claim 12, wherein at least one of the generation of the first mapping and the generation of the second mapping is based at least in part on at least one of: a pre-defined mapping, a source customer relationship management system or service, a past mapping for a same customer, synonyms, and a machine learning model mapping prediction.

14. The system of claim 12, wherein the automatic generation of at least one of the first mapping and the second mapping is confirmed or corrected via the user interface.

15. The system of claim 1, wherein the records are ingested from a source system.

16. The system of claim 15, wherein the shared access is provided by query.

17. The system of claim 15, wherein results show first user phases per the first schema and second user phases per the second schema as mapped.

18. The system of claim 17, wherein a record is not included in results if a relevant phase in an applicable schema is not mapped to any phase in at least one of the first or second schema.

19. The system of claim 1, wherein:
 the first schema includes a first sequence of phases; and
 the second schema includes a second sequence of phases.

20. A method, comprising:
 generating a first mapping that maps each of at least a subset of sequential phases defined in a first schema to a corresponding source schema phase associated with a source set of records;
 generating a second mapping that maps each of at least a subset of sequential phases defined in a second schema to a corresponding phase defined in the first schema, wherein at least a portion of the first mapping is different from at least a portion of the second mapping;
 using the first mapping and the second mapping to provide shared access to records comprising data from the source set of records, at least in part by:
  using the first mapping to obtain and store data comprising one or more records from the source set of records; and
  using the second mapping to provide shared access to said data comprising one or more records from the source set of records, wherein the shared access includes providing a first user access to records associated with a second user, the first user being associated with the first schema and the second user being associated with the second schema.

21. A computer program product embodied in a non-transitory computer readable medium and comprising computer instructions for:

generating a first mapping that maps each of at least a subset of sequential phases defined in a first schema to a corresponding source schema phase associated with a source set of records;

generating a second mapping that maps each of at least a subset of sequential phases defined in a second schema to a corresponding phase defined in the first schema, wherein at least a portion of the first mapping is different from at least a portion of the second mapping;

using the first mapping and the second mapping to provide shared access to records comprising data from the source set of records, at least in part by:

using the first mapping to obtain and store data comprising one or more records from the source set of records; and using the second mapping to provide shared access to said data comprising one or more records from the source set of records, wherein the shared access includes providing a first user access to records associated with a second user, the first user being associated with the first schema and the second user being associated with the second schema.

* * * * *